US009658338B2

United States Patent
Mole et al.

(10) Patent No.: US 9,658,338 B2
(45) Date of Patent: May 23, 2017

(54) APPARATUS AND METHOD TO CONSERVE POWER IN A PORTABLE GNSS UNIT

(75) Inventors: Stephen Mole, Mountain View, CA (US); Frank van Diggelen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1266 days.

(21) Appl. No.: 13/446,744

(22) Filed: Apr. 13, 2012

(65) Prior Publication Data

US 2013/0271314 A1    Oct. 17, 2013

(51) Int. Cl.
    G01S 19/19    (2010.01)
    G01S 19/34    (2010.01)
    G01S 19/49    (2010.01)
    G01C 22/00    (2006.01)
    G01S 19/52    (2010.01)

(52) U.S. Cl.
    CPC ............ G01S 19/19 (2013.01); G01C 22/006 (2013.01); G01S 19/34 (2013.01); G01S 19/52 (2013.01)

(58) Field of Classification Search
    CPC .......... G01S 19/34; G01S 19/19; G01S 19/49; G01S 19/52; G01C 22/006
    See application file for complete search history.

(56) References Cited

U.S. PATENT DOCUMENTS

| 6,009,751 | A * | 1/2000 | Ljung | G01C 19/5719 |
| | | | | 73/504.02 |
| 6,204,807 | B1 * | 3/2001 | Odagiri | G01S 19/34 |
| | | | | 342/357.57 |
| 6,546,336 | B1 * | 4/2003 | Matsuoka | G01C 22/006 |
| | | | | 701/408 |
| 7,057,551 | B1 * | 6/2006 | Vogt | A63B 69/0028 |
| | | | | 342/357.57 |
| 7,359,713 | B1 * | 4/2008 | Tiwari | G01S 19/34 |
| | | | | 342/105 |

(Continued)

FOREIGN PATENT DOCUMENTS

| JP | 59202016 A | * | 11/1984 |
| TW | 200701949 A | * | 1/2007 |

OTHER PUBLICATIONS

English translation of TW 200701949 A.*

(Continued)

*Primary Examiner* — Bernarr Gregory
*Assistant Examiner* — Fred H Mull
(74) *Attorney, Agent, or Firm* — Sterne, Kessler, Goldstein & Fox P.L.L.C.

(57) ABSTRACT

A device is disclosed that is capable of determining its location using high-power with high accuracy, and using low-power with lower accuracy. By coordinating usage between the high power method and the low power, overall power consumption of the device can be significantly reduced without a significant reduction in accuracy. Such high accuracy may be achieved through the use of a GNSS unit, such a GPS receiver. In addition, the low-power alternative may be achieved using an accelerometer, together with software, hardware or firmware for extrapolating a speed based on the force measurements by the accelerometer. In this manner, the GPS receiver can be operated for only a fraction of overall use, primarily to provide adjustment data necessary to calibrate usage of the accelerometer.

12 Claims, 7 Drawing Sheets

(56) References Cited

U.S. PATENT DOCUMENTS

| | | | | |
|---|---|---|---|---|
| 7,706,976 B1* | 4/2010 | Peake | ............... | G01P 3/64 |
| | | | | 340/988 |
| 2005/0083230 A1* | 4/2005 | Harvey | ............ | G01S 19/34 |
| | | | | 342/357.74 |
| 2006/0136173 A1* | 6/2006 | Case, Jr. | ......... | A63B 24/00 |
| | | | | 702/182 |
| 2010/0277367 A1* | 11/2010 | Dicke | ............ | G01S 19/34 |
| | | | | 342/357.74 |
| 2011/0003665 A1* | 1/2011 | Burton | ............ | G04F 10/00 |
| | | | | 482/9 |
| 2011/0231152 A1* | 9/2011 | Kawabe | .......... | G01G 19/50 |
| | | | | 702/160 |
| 2013/0090213 A1* | 4/2013 | Amini | .......... | G06F 19/3481 |
| | | | | 482/8 |
| 2014/0375450 A1* | 12/2014 | Tsubouchi | ...... | G06Q 10/0833 |
| | | | | 340/539.11 |

OTHER PUBLICATIONS

S. An et al., Two-Input Axis Angular Rate Sensor, SPIE Conference on Smart Electronics and MEMS, SPIE vol. 3673, Mar. 1999.*

Often. (2011). The American Heritage Dictionary of the English Language. Boston, MA: Houghton Mifflin. Retrieved from http://search.credoreference.com/content/entry/hmdictenglang/often/0.*

D.R. Bassett Jr, Validity and Reliability Issues in Objective Monitoring of Physical Activity, Research Quarterly for Exercise and Sport, vol. 71(2), p. 30-36, Jun. 2000.*

* cited by examiner

APPARATUS AND METHOD TO CONSERVE POWER IN A PORTABLE GNSS UNIT

FIELD OF INVENTION

The invention relates to power conservation and extending battery life within a portable GNSS unit, and more specifically to a GNSS unit that operates cooperatively with a low-power supplemental speed measurement unit in order to allow the GNSS to periodically enter a low power state.

BACKGROUND

Related Art

Global Navigation Satellite Systems (GNSS) are satellite navigation systems with global coverage, and include the American Global Positioning System (GPS) and Russian Global Navigation Satellite System (GLONASS). GNSS receivers are becoming commonplace in numerous different settings. For example, distinct GPS units are used in motor vehicles for providing mapping and direction functionality for an operator. In addition, smartphones are increasingly being equipped with GPS receivers, which allow for mapping and navigation, as well as location-specific device operations (e.g., such as providing webpages during internet browsing that are particularly relevant to the user's current location.

GNSS receivers have also been incorporated into personal exercising. For example, a GNSS receiver may be included within a bicycle speedometer, or a sportwatch, to track the user's distance, speed, location, and/or exercise route.

However, because many of these devices are required to be extremely portable, the available battery is often very small. Typical GNSS receivers require a relatively large amount of current for operation. Therefore, the continuous operation of the GNSS receiver in such portable devices quickly drains the available battery, which reduces the usefulness of these devices by significantly limiting the length of its sessions of use.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Further, the scope of the invention is defined only in accordance with the following claims and their equivalents.

Embodiments of the disclosure may be implemented in hardware (e.g., circuits), firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present disclosure is to be described in terms of a GNSS receiver and its host device, those skilled in the relevant art(s) will recognize that the present disclosure may be applicable to other devices for measuring speed, distance, and/or location without departing from the spirit and scope of the present disclosure.

An Exemplary GNSS Host Device

Figure 1:
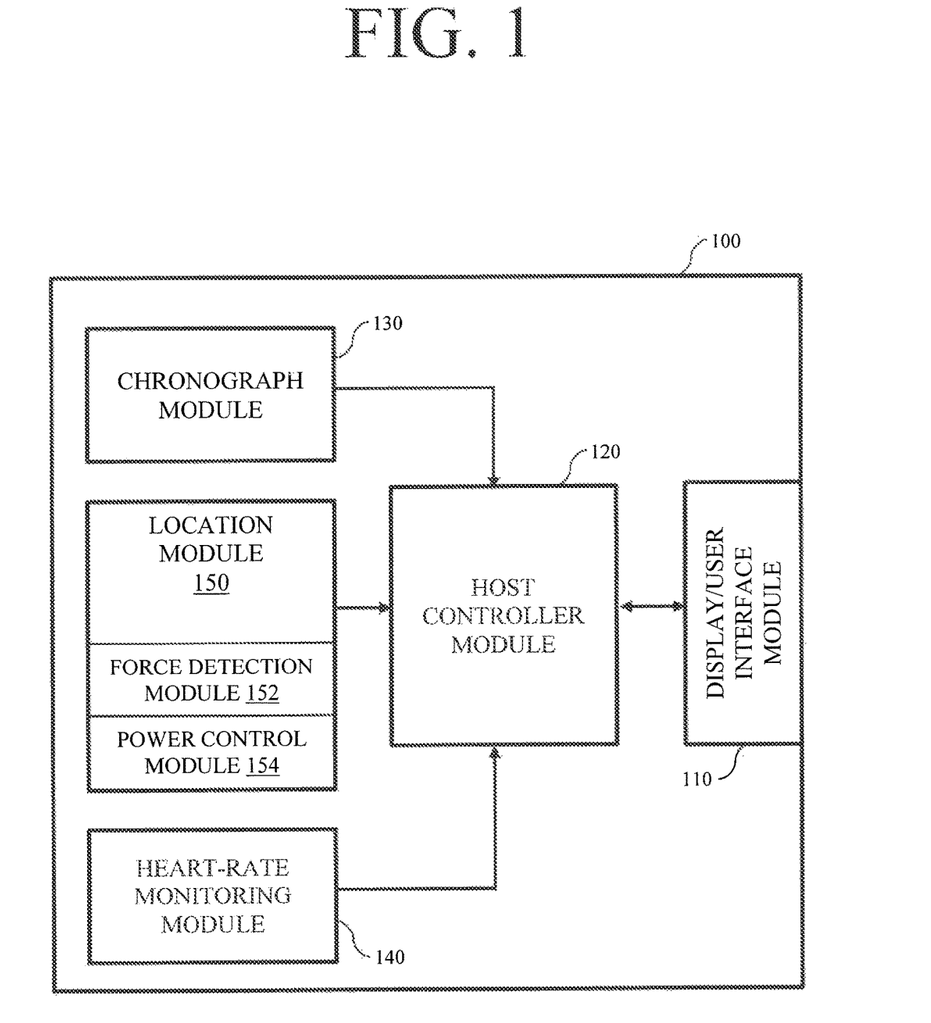
FIG. 1 illustrates a block diagram of an exemplary host device.

FIG. 1 illustrates a block diagram of an exemplary GNSS host device 100. As discussed above, GNSS functionality may be included in numerous different types of host devices. Therefore, in order to illustrate the functionality and advantages of the GNSS system of the present disclosure, the host device 100 is illustrated and described as a GNSS-enabled sportwatch. However, those skilled in the relevant art(s) will readily recognize that the host device may be any device configured to receive location-based information. In addition, some functions discussed below may be unique to a sportwatch application, while other absent functionality may be present in other GNSS-enabled devices.

The host device 100 includes a display/user interface module 110 for displaying information to, and receiving inputs from, a user. The host device 100 may also include a chronograph module 130 for performing timekeeping functions and a heart-rate monitoring module 140 for measuring a heart-rate of a user. A host controller module 120 performs background control and data distribution within the host device, and operates to provide cooperative communication between the various components within the host device.

The host device 150 also includes a location module 150. The location module 150 determines the location of the host device 100 and performs various functions using that location. The location module 150 of the present disclosure includes a force detection module 152 and a power control module 154. The force detection module 152 detects a force exerted on the host device 100 in order to estimate movement of the host device 100, and the power control module 154 controls the operation of various components within the location module 150, as discussed in further detail below.

An Exemplary Location Module

Figure 2:
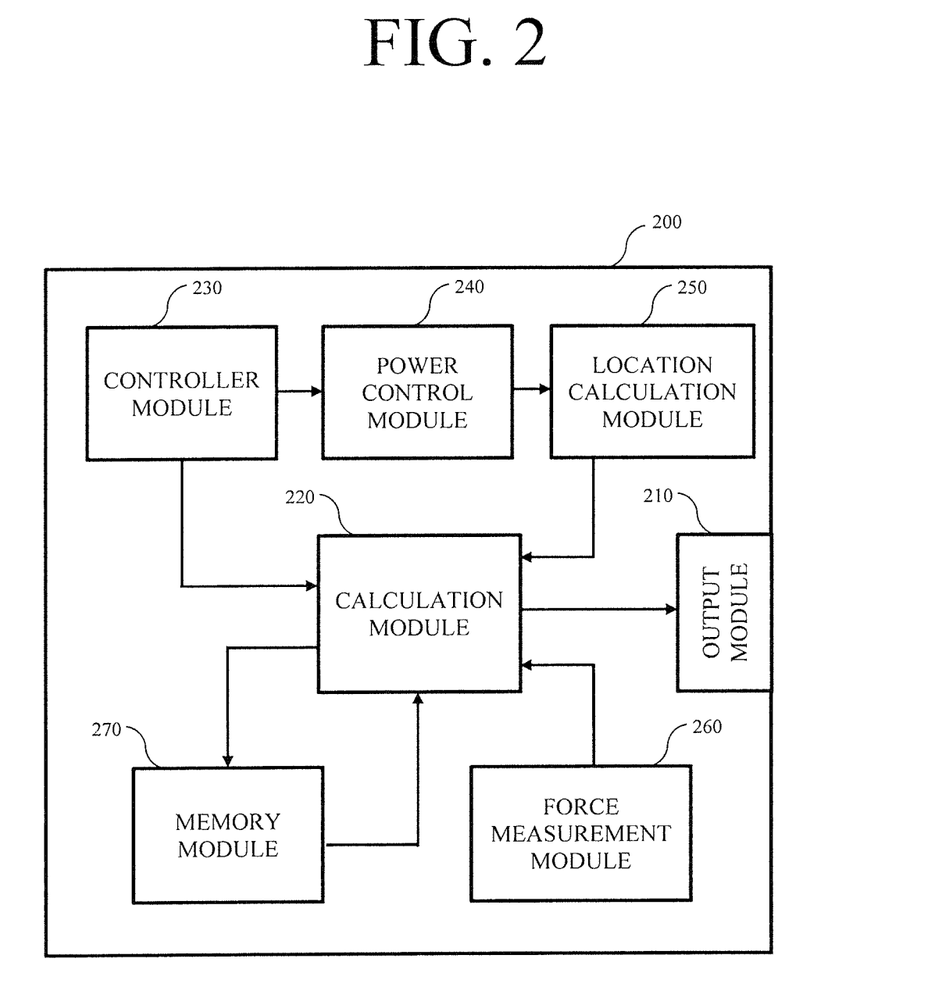
FIG. 2 illustrates a block diagram of an exemplary location module that may be included within a host device.

FIG. 2 illustrates a block diagram of an exemplary location module 200 that may be included within the host device 100, and which may represent an exemplary embodiment of the location module 150. The location module 200 includes a force measurement module 260 that may represent an exemplary embodiment of the force detection module 152, and a power control module 240 that may represent an exemplary embodiment of the power control module 154.

The location module 200 includes a location calculation module 250 for determining a current location of the host device 100. The location calculation module 250 may be a GNSS receiver, such as a GPS and/or GLONASS receiver capable of determining a current device location. The location module 200 also includes a calculation module 220. The calculation module 220 receives locations from the location calculation module 250 and determines a movement speed of the device based on those locations. This may be calculated from the measured satellite Doppler frequencies or from the difference between two position estimates:

$$s = \|v\|_2 = \left\| \frac{p_1 - p_0}{t_1 - t_0} \right\|_2, \quad (1)$$

where s is the calculated speed and v is the calculated velocity of the host device 100, $p_1$ is the position of the host device 100 at time $t_1$, and $p_0$ is the position of the host device 100 at some earlier time $t_0$, and $\|x\|_2$ represents the 2-norm (ie. the square root of the sum of the squares of the individual elements) of the vector x.

Although performing speed calculations in this manner is accurate, it is extremely inefficient. GNSS receivers consume significant amounts of power to operate their radio receivers. Consequently, constantly running the location calculation module 250 at full power significantly reduces battery life of a portable host device. Therefore, the location module 200 also includes a force measurement module 260 and a memory module 270.

The force measurement module 260 can be any component capable of detecting acceleration and/or force exerted on the host device 100, such as a single or multi-axis accelerometer. For purposes of this discussion, the force measurement module 260 measures forces. However, those skilled in the relevant art will recognize that force measurement modules measure such forces in the form of acceleration. Therefore, force and acceleration are used interchangeably herein when discussing the operation of the force measurement module 260.

During running, walking, etc., the steps taken by the user of the host device will be recognized by the force measurement module 260 as forces exerted on the host device 100. These measurements can then be analyzed to supplement the speed and/or location calculations of the location module 200, as discussed in further detail below.

Figure 3:
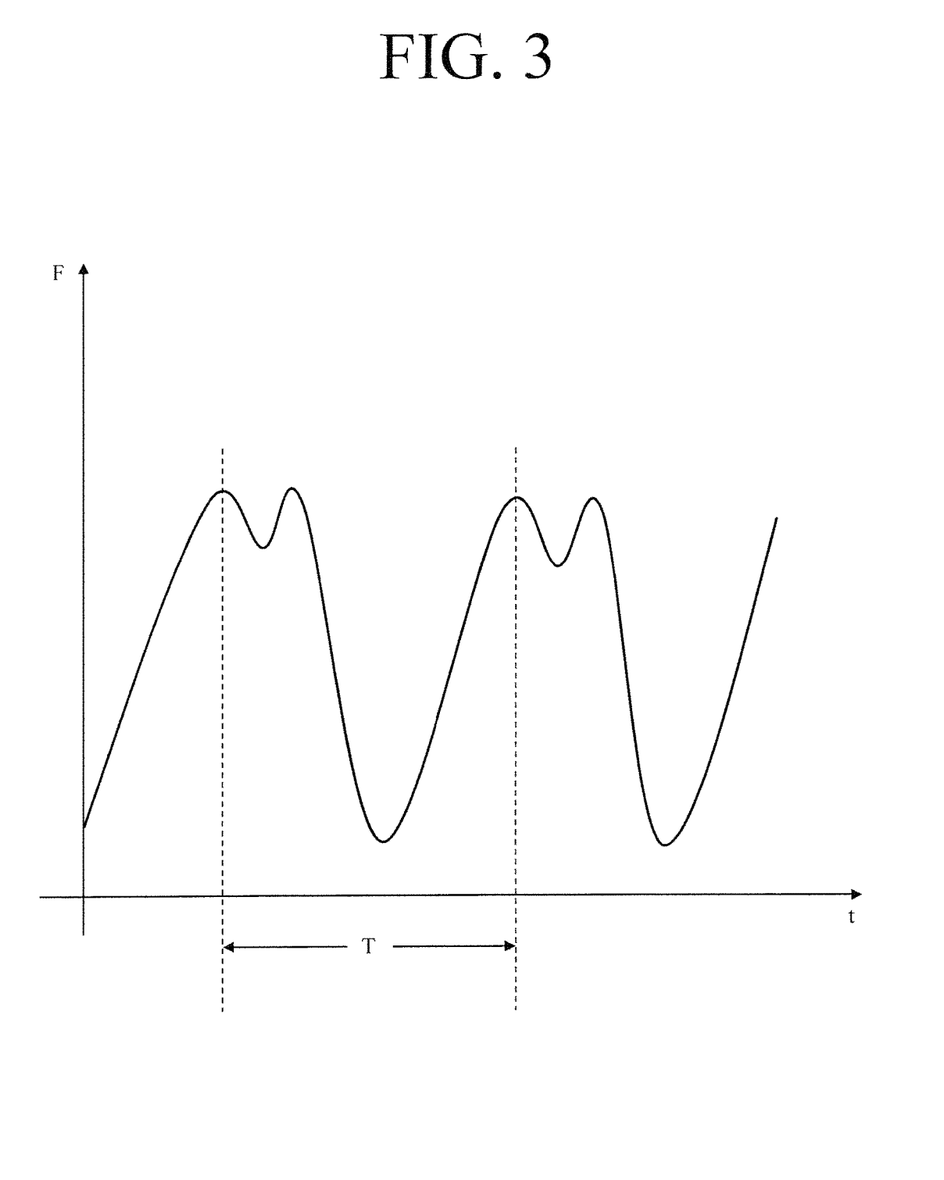
FIG. 3 illustrates an exemplary force waveform that may be detected by a location module.

FIG. 3 illustrates an exemplary force waveform detected by the force measurement module 260. As shown in FIG. 3, the vertical axis of the graph represents the measured force and the horizontal axis represents time. The illustrated graph represents the force measured along only a single axis of the accelerometer (e.g., the vertical axis), and individual waveforms may be generated for the measurements of each axis.

As shown in FIG. 3, the waveform is substantially periodic with a period of approximately T. Each period of the measured force represents a step taken by the user. Consequently, the user is walking/running with a step frequency equal to 1/T. As the force measurement module 260 detects the exerted forces on the host device 100, the force measurement module 260 forwards the same to the calculation module 220.

By performing pattern matching and/or signal analysis of the measured force waveform, the calculation module 220 is able to identify the step frequency. From the step frequency, the calculation module 220 can determine the current speed of the host device 100 based on a step length of the user.

1. Step Length

There are multiple ways for the location module 200 to acquire the step length of the user. Each acquisition method has its own benefits, as discussed below.

A. Direct Input

One option is for the host device 100 to simply prompt the user to input the step length via the display/user interface module 110. Specifically, perhaps at first start-up or after being instructed by the user, the host controller module 120 causes a prompt to be displayed by the display/user interface module 110 requesting the step length of the user. Using the user interface of the host device, the user then inputs an expected step length. The host controller 120 receives the input step length from the display/user interface module 110 and forwards the step length to the location module 200. The location module 200 receives the step length and causes it to be stored in the memory module 270.

The simplicity of directly acquiring the step length makes this method particularly beneficial. Specifically, directly acquiring the step length requires minimal calculation and power consumption.

B. Measure

Alternatively, the location module 200 can acquire the step length of the user through measurement. For example, while operating the location calculation module 250, the calculation module 220 also receives the force waveform from the force measurement module 260. Using the above-discussed techniques, the calculation module 220 determines the step frequency of the user from the force waveform received from the force measurement module 260. Using equation (1), above, the calculation module 220 also determines the speed of the user. The calculation module 220 can then determine the step length of the user by applying the following equation:

$$SL = \frac{s}{f_s}, \quad (2)$$

where SL is the step length, s is the calculated speed, and $f_s$ is the calculated step frequency.

Once measured, the calculation module 220 can store the step length in the memory module 270. The calculation module 220 can then retrieve the step length from the memory module 270 when calculating the speed based on the force waveform generated by the force measurement module 260.

By measuring, the location module 200 can obtain a very accurate step length. In addition, measuring the step length does not require any user input, which makes the system more user-friendly and automated.

C. Hybrid

The location module 200 may also use a hybrid method to obtain and maintain the step length of the user. In this manner, it may be possible to even further increase accuracy of the step length, as well as allow for the step length to be dynamically maintained.

In one exemplary hybrid measurement, the location module 200 receives a directly input step length from the user, and also measures the step length based on information obtained from the location calculation module 250 and the force measurement module 260. The "final" step length can then obtained by averaging or weighted-averaging the two step lengths.

Allowing the user to directly input the step length, and relying on the positions determined by the location calculation module 250 each have resulting inaccuracies. By averaging, or performing a weighted average, of those two step lengths, it may be possible to acquire a step length that is substantially absent of the inherent inaccuracies of the individual input methods. When performing the weighted average, the values may be weighted based on their respective accuracies, including the resolution and accuracy of the location calculation module 250.

In another exemplary hybrid, the location module 200 measures the step length repeatedly during use in order to dynamically maintain the step length. For example, the location module 200 may measure the step length near the beginning of each use of the host device 100. This would compensate for different users, and/or different running styles.

In another example, the location module 200 may measure the step length with some predetermined frequency. For example, the location module 200 may measure the step length every 30 seconds. In this manner, the step length can be maintained even as the user's movement pace falls (e.g., due to fatigue, terrain, etc.).

In another example, the location module 200 may measure the step length after one or more conditions have been satisfied. For example, the location module 200 may measure the step length when the calculated speed has changed (from the speed calculated for the previously-measured step length) by more than a predetermined amount. This may be performed by storing, in association with the measured step length, a speed of the host device 100 measured at the time of the step length. The location module 200 may then proceed to measure the step length when the current measured speed of the host device 100 differs from the previously-stored speed by more than a predetermined amount. This provides the advantages of updating the step length based on changes in the user's condition while reducing calculation amount.

2. Power Conservation

As discussed above, although typical GNSS-enabled devices operate the GNSS constantly during use, doing so consumes significant amounts of power, which quickly drains available battery. However, by providing the host device 100 with a low-power, supplemental means for tracking speed and/or location (e.g., force measurement module 260 and calculation module 220), the host device 100 can greatly increase battery life through cooperative use of the GNSS and the supplemental tracker.

As shown in FIG. 2, the location module 200 includes a controller module 230 and a power control module 240. The power control module 240 is connected to, and controls the power settings of, the location calculation module 250 (which functions as a GNSS module or other high-power location and/or speed tracking module).

In an embodiment, the force measurement module 260 operates in a consistent manner to provide force measurements to the calculation module 220. This is because the force measurement module 260 operates at a relatively low power, and its continued use therefore has only minimal effect on battery life.

Beginning at the time the device starts-up, the controller module 230 instructs the power control module 240 to operate the location calculation module 250 at full power. During this period, the controller module 230 also instructs the calculation module 220 to use the generated locations received from the location calculation module 250 in order to determine current speed. In addition, the calculation module 220 can also utilize this initialization period to calculate an initial step length using the method discussed above, and to store the initial step length in the memory module 270.

After a condition has been satisfied, the controller module 230 may instruct the power control module 240 to place the location module 250 into a low-power state. This state may be an ON/low-power state, or may be an OFF state, depending on application. The condition for causing the location calculation module 250 to enter the low-power state may be the passage of a certain amount of time since start-up, the passage of a certain amount of time since the location calculation module 250 began to receive and output locations (e.g., when the GNSS connected with an available GNSS satellite), and/or after a determination that the host device 100 is moving at a relatively uniform speed based on calculations by the calculation module 220.

Once the location calculation module 250 has entered the low-power state, the controller module 230 instructs the calculation module 220 to perform speed calculations based on the force measurements received from the force measurement module 260 and the step length stored in the memory module 270. During this period, because the force measurement module 260 requires significantly less operating power than the location calculation module 250, the host device 100 consumes a much smaller amount of power than during standard operation.

After the occurrence of some second condition, the controller module 230 instructs the power control module 240 to operate the location calculation module 250 in its high-power state again. The condition may be the passage of a predetermined amount of time from entering of the low-power state, and/or the calculation module 220 determining a large change in speed.

The change in speed may be determined by determining whether a current speed falls outside of a range or percentage of an average or base speed. For example, a base speed may be set as the speed of the host device 100 at the time the location calculation module 250 entered the low-power state. The range may then be some predefined percentage of the base speed that falls above and below the base speed. For example, a base speed may be set as 10 mph. The range may be defined as 10% of the base speed. Therefore, the allowable range becomes 9-11 mph. If the speed of the host device 100 falls outside of this range, then the controller module 230 initiates the power-up of the location calculation module.

During these subsequent power-ups of the location calculation module 250, the calculation module 220 can again calculate speed based on the locations received from the location calculation module 250. In addition, the calculation module 220 can also use the locations to refine its calculations that are to be used during the low-power periods. For example, the calculation module 220 may update the step length using the method discussed above.

The controller module 230 continues to switch between the low- and high-power states in order to maintain accurate speed calculations, while reducing power consumption. In this manner, the power consumption of the location module 200, and therefore of the host device 100, is reduced.

The controller module 230 can switch power states based on any one, or more than one, of the conditions discussed above, as well as any other conditions that may be useful within the spirit and scope of the present disclosure. However, the controller module 230 preferably controls the switching of the power states based on predetermined time intervals, which can be interrupted by large speed fluctuations. An exemplary time ratio for operating in a high-power state is 1:5 or 2:5. This means that the location calculation module 250 (high-power module) operates in the high-power state for is out of every 5 s, or 2 s out of every 5 s, respectively.

Presuming that the location calculation module 250 operates at 100 mA, whereas the force measurement module 260 operates at 5 mA, it is easy to see the power savings resulting from the above preferred ratios. For example, a tradition GNSS-enable device would operate the high-power module constantly, meaning 100 mA*100%=100 mA are required for device use. Assuming that the location calculation module 250 enters an OFF state during the low-power period, using the 1:4 ratio gives approximately (20%*100 mA)+ (100%*5 mA)=25 mA over the same five second period, resulting in approximately a 75% average power reduction.

In another embodiment, in order to even further reduce power consumption, the force measurement module 260 (low-power module) can be turned off or into a low-power state during high-power state periods.

3. Mapping

Many GNSS-enabled devices, especially fitness-related devices, include mapping modules for tracking the user's route based on the locations received from the GNSS unit. This same functionality can be achieved using the above power-saving techniques, as discussed below.

As discussed above, in order to conserve power, the high-power location calculation module 250 should only be operated for short intervals of overall device operation. Therefore, the location calculation module 250 will be unable to constantly provide location information in order to track the route of the host device 100.

In one embodiment, the calculation module 220 simply stores in the memory module 270 each first location received from the location calculation module 250 during each high-power state. This allows the device to track the route, albeit at a resolution of approximately one point every five seconds (using the above preferred ratio).

In another embodiment, during the high-power periods, the calculation module 220 receives locations from the location calculation module 250 in order to calculate speed. From these locations, the calculation module 220 can determine a vector that defines a direction of motion of the host device 100. During subsequent low-power states, the calculation module 220 stores measured speeds. Using internal circuitry software, or similar software/circuitry on an external device, the stored speeds can be used in conjunction with the stored vectors to extrapolate and approximate an actual route taken by the user. Because of the computing power that may be desired to calculate an accurate route from the available information, the route calculating may be performed by an external device, such as an all-purpose computer.

4. Automatic Adjustment

In addition to the above, the location module 200 can also perform various automatic adjustments in order to improve accuracy. For example, the location module 200 may automatically adjust step length based on speed and/or whether the device is traveling uphill or downhill.

Figure 6:
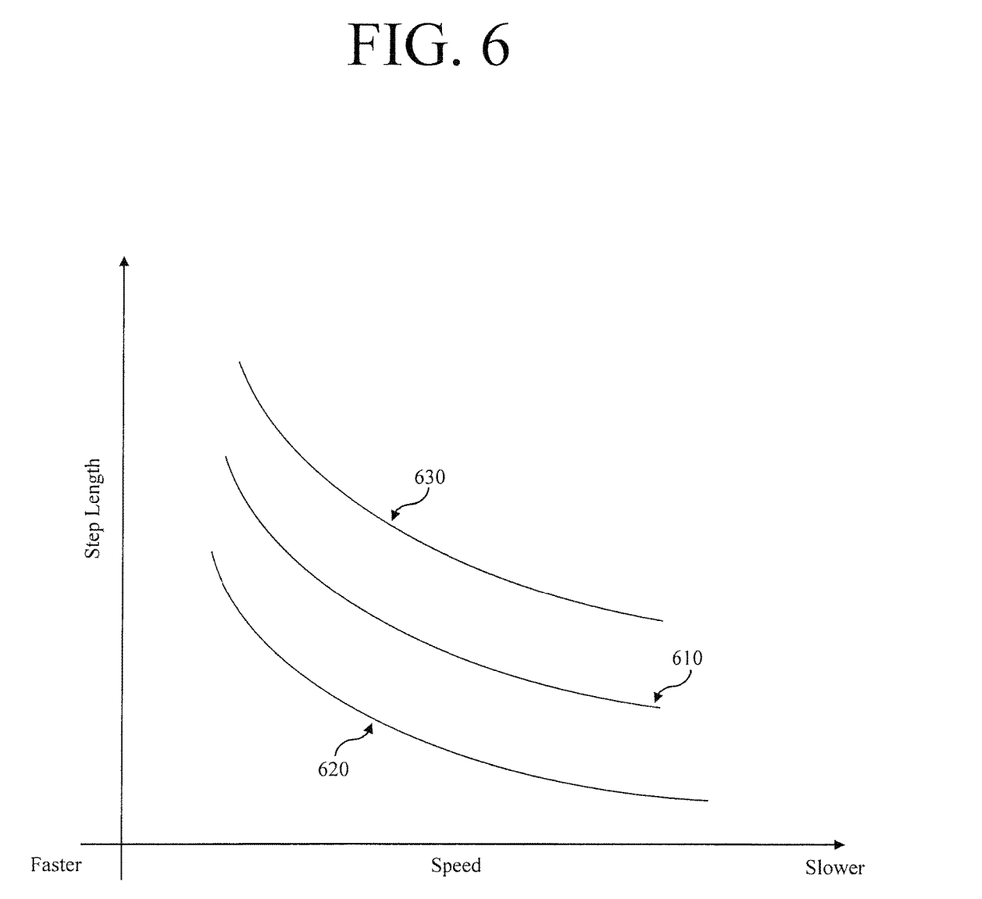
FIG. 6 illustrates exemplary step length vs. speed waveforms for different modes of motion.

FIG. 6 illustrates a set of exemplary waveforms for different "modes" of motion. The graph illustrates step length vs. speed, with faster speeds being on the left and slower speeds on the right. As shown from, for example, base curve 610, higher speeds result in longer step lengths, whereas slower speeds correspond with shorter step lengths. Therefore, by mapping a currently-measured speed to the base curve 610, the location module 200 can determine an approximate corresponding step length. This can be used as a substitute to equation (2), above, or can be used to adjust the step length during low-power periods.

In addition to the base curve 610, which represents movement along a relatively flat surface, the graph of FIG. 6 also includes uphill curve 620 representing speed-to-step length relationship when moving uphill, and downhill curve 630 representing speed-to-step length relationship when moving downhill. As expected, step length is, on average, longer when traveling downhill than when traveling uphill or on a flat surface. It should be noted that there may be any number of curves representing different angles of ascent/descent.

The location module 200 may determine that the device is traveling uphill or downhill in multiple different ways. For example, the speed determination module 220 may make this determination based on information from the force measurement module 260. Such indicators from the force measurement module 260 may be changes in force readings on either of the non-vertical axes, and/or changes in amplitude or frequency of the patterns generated by the vertical axis. For example, when traveling downhill, steps are taken with greater impact, thereby resulting in a greater force output (larger amplitudes of the output waveform) by the force measurement module 260.

Another way to determine whether traveling uphill or downhill is to compare the frequency of the force measurements output by the force measurement module 260 with the speed calculated during high-power periods. If speed stays constant, but the number of steps increases, then the device is likely traveling uphill. In other words, more steps are required to maintain constant speed when traveling uphill due to the shortened step length (see FIG. 6).

After determining that the user is traveling uphill or downhill, the location module 200 can adjust step length, or calculate speed based on the relationships depicted in FIG. 6. For example, if the user is found to be traveling uphill, the calculation module 220 can rely on the relationships of the uphill curve 620 for calculating speed and step length. Similar calculations can be made based on the downhill curve 630 when the user is determined to be traveling downhill.

Those skilled in the relevant art(s) will recognize that many modifications may be made to the above location module and are within the spirit and scope of the present disclosure. For example, a controller module 230 may be absent from the location module, allowing for the power control module 240 to make its own determinations regarding power control. In addition, the output module 210 may function both for output and input, thereby allowing two-way communication between the host device 100 and the location module 200.

Exemplary Methods for Conserving Power in GNSS-Enabled Device

Figure 4:
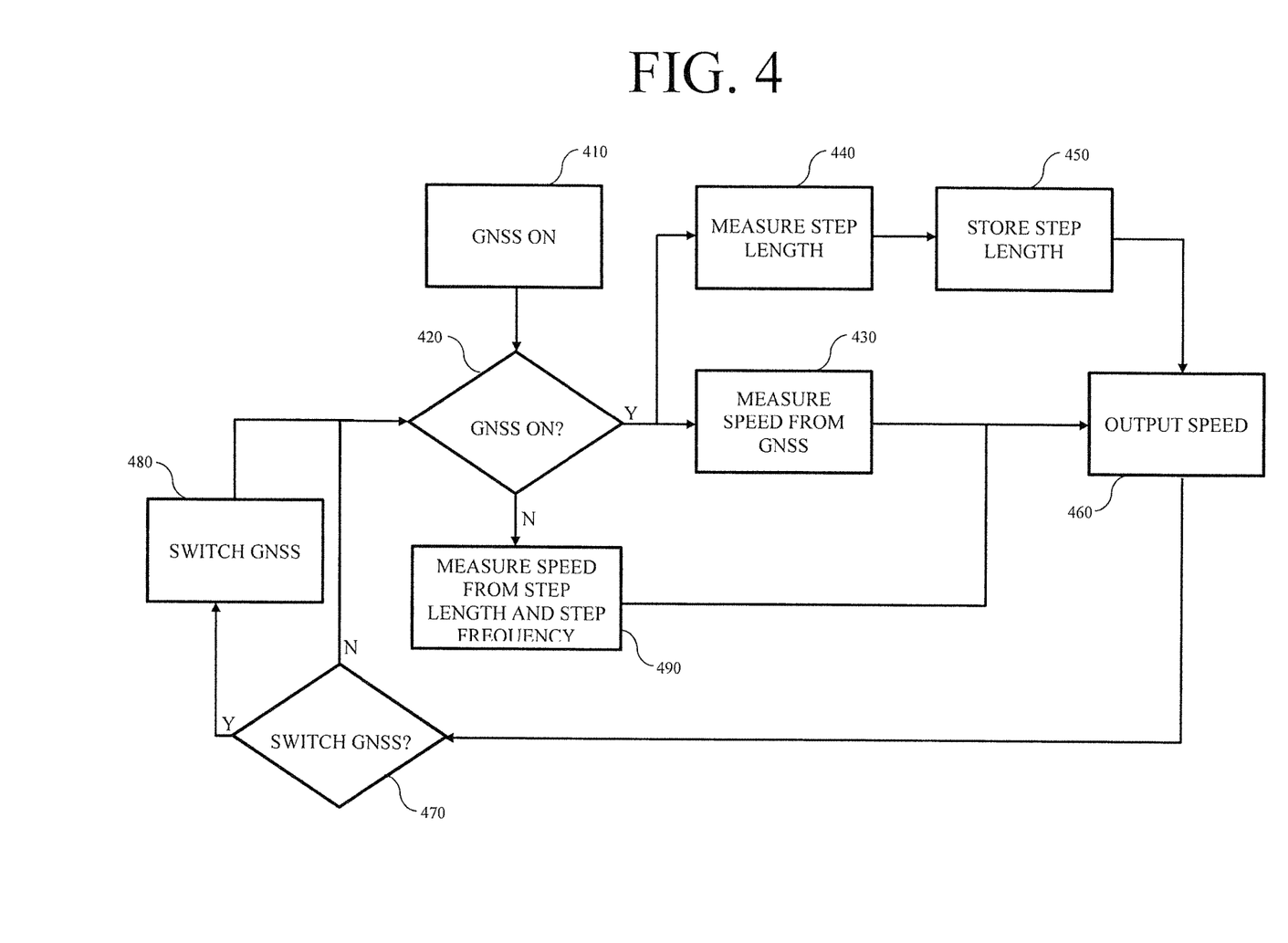
FIG. 4 illustrates a block diagram of an exemplary speed measurement algorithm that may be implemented within a location module.

FIG. 4 illustrates a block diagram of an exemplary speed measurement algorithm that may be implemented within the location module 200. At start-up, the GNSS is turned to a high-power state (410). Because the GNSS is in the high-power state (420), the location module 200 utilizes this opportunity to measure step length (440) while also measuring the speed of the host device 100 based on locations received from the GNSS (430). Once the step length has been measured (440), the step length is stored in memory (450). Meanwhile, the measured speed is output for display (460).

After the speed has been output, a determination is made regarding whether to switch the power state of the GNSS (470). This determination may depend on one or more conditions, which are discussed in detail above. Such conditions may include, for example, the passage of a predetermined amount of time and/or a change in speed that exceeds a predetermined amount. If the conditions are not satisfied, the GNSS remains in its current power state. Alternatively, if those conditions are met, the GNSS power state is switched (480).

At this point, the location module 200 begins the cycle of switching between the high-power state, and the lower power state. In the high-power state, the location module 200 will function substantially as discussed above. Alternatively, in the lower power state, when it is determined that the GNSS is OFF (420), the speed will be measured based on the stored step length and the step frequency received from a force measurement module (490). This speed will then be output to the user (460), and the location module will again make a determination as to whether the power state of the GNSS should be switched (470). This cycle continues until the host device 100 is turned off, or until some user input stops the activity of the location module 200.

Figure 5:
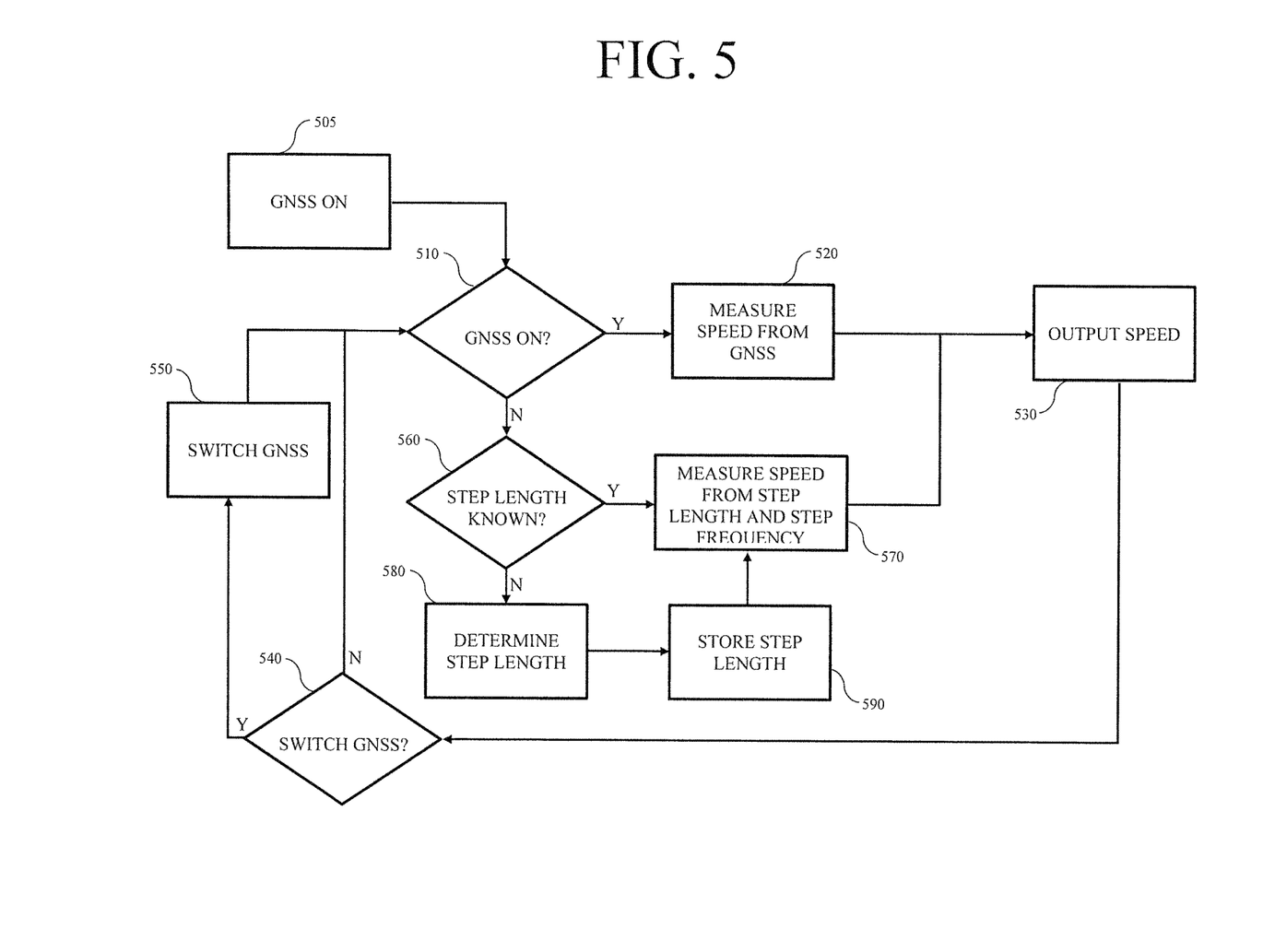
FIG. 5 illustrates a block diagram of an exemplary speed measurement algorithm that may be implemented within a location module.

FIG. 5 illustrates a block diagram of another exemplary speed measurement algorithm that may be implemented within the location module 200. This algorithm is very similar to that of FIG. 4, but corresponds to the method discussed above of only making a single determination as to step length.

For example, at start-up, the GNSS is in an ON state (505). Because the GNSS is ON (510), the speed is measured based on the GNSS locations (520) and output for display (530). After output, a determination is made regarding whether to switch the GNSS (540), and the GNSS is switched if the certain conditions are satisfied (550).

At this time, a determination is made as to whether the GNSS is in the high-power state or the low-power state. If the GNSS is in the high-power state (Y—510), the algorithm continues as above. Alternatively, if the GNSS is in the low-power state (N—510), another determination is made regarding whether the step length is known (560). This may occur if input by the user or previously set. If the step length is not known (N—560), then the step length is calculated (580) and stored (590) for future use. The speed is then measured based on this stored step length and the step frequency received from a force measurement module (570). Alternatively, if the step length was already known (Y—560), the speed is immediately measured based on this speed and the step frequency (570). The measured speed is then output for display (530). In this manner, the step length is only calculated if necessary, and then only calculated once.

Those skilled in the relevant art(s) will recognize that the above methods can additionally or alternatively include any of the functionality of the host device 100 and/or the location module 200 discussed above, as well as any of its modifications. Further, the above description of the exemplary method should neither be construed to limit the method nor the description of the host device 100 and location module 200.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
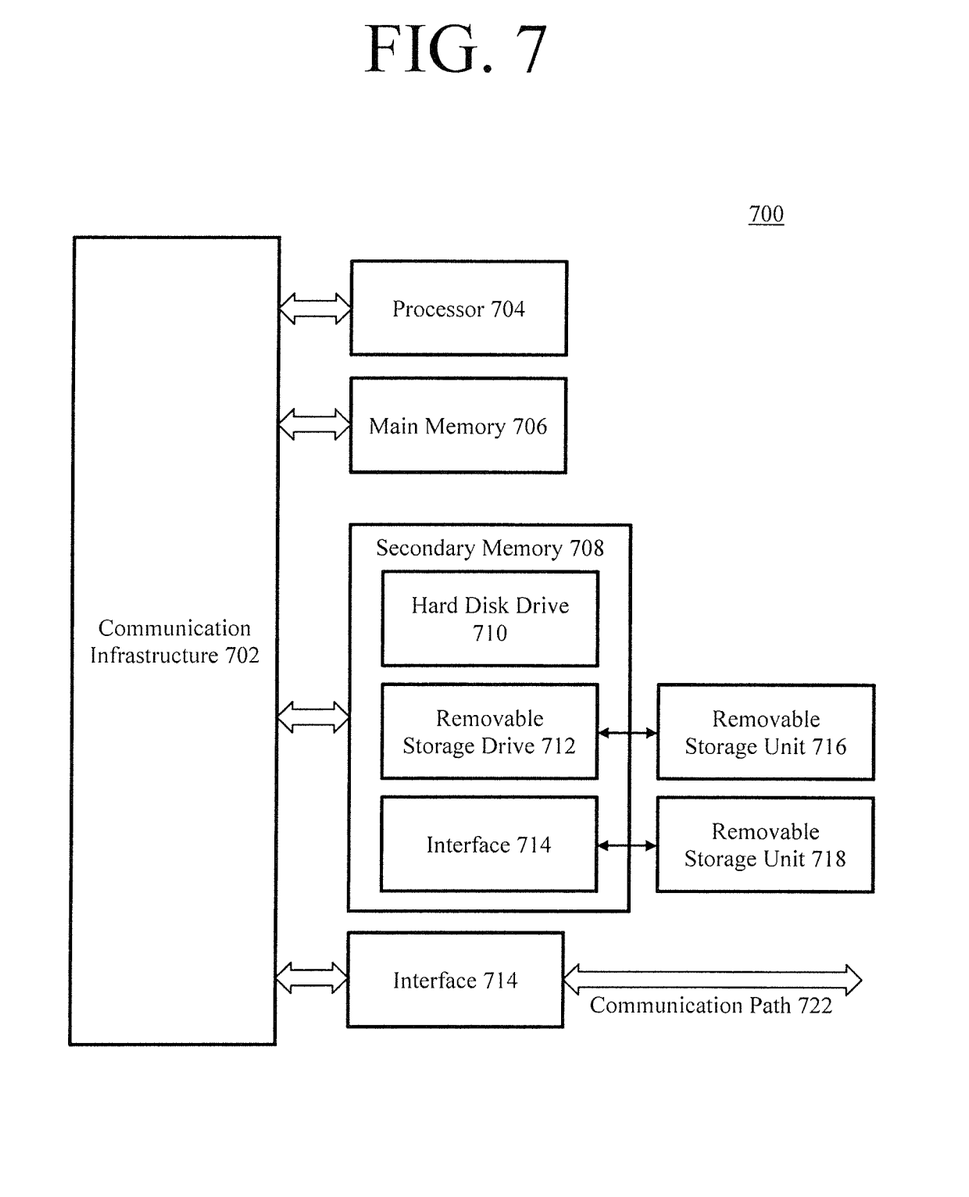
FIG. 7 illustrates an exemplary computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. One or more of the modules depicted in the previous figures can execute on one or more distinct computer systems 700, including, for example, the controller module 230, power control module 240, location calculation module 250, and calculation module 220.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily it hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description, and not the Abstract, is intended to be used to interpret the claims. The Abstract may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. The invention should not be limited by any of the above-described exemplary embodiments, but should be defined only in accordance with the following claims and their equivalents.

What is claimed is:

1. A method for measuring a speed of a GNSS-enabled device, the method comprising:
   receiving force measurements from a force measurement module; and
   during a first operation state:
      operating a GNSS receiver in a high-power state;
      calculating a step length based on the force measurements received from the force measurement module and location information received from the GNSS receiver;
      storing the step length in a memory module;
      calculating the speed based on the location information received from the GNSS receiver;
      switching from the first operation state to a second operation state when a first predetermined time period has elapsed since the GNSS-enabled device entered the first operation state; and switching from the second operation state to the first operation state when:
a second redetermined time period has elapsed since the GNSS-enabled device entered the second operation state; and
the calculated speed has changed from a previously-calculated speed by more than a predetermined threshold.

2. The method of claim 1, further comprising:
during the second operation state:
operating the GNSS receiver in a low-power state; and
calculating the speed based on the force measurements received from the force measurement module and the stored step length.

3. The method of claim 2, further comprising:
during the first operation state:
detecting a first force waveform from the force measurement module; and
storing the first force waveform.

4. The method of claim 3, further comprising:
during the second operation state:
detecting, by the force measurement module, a second force waveform; and
performing pattern matching on the second force waveform to identify steps within the second force waveform.

5. The method of claim 4, wherein the force measurement module is configured to detect force on a plurality of force axes, and
wherein the second force waveform is detected on a first force axis of the plurality of force axes.

6. The method of claim 5, further comprising:
during the second operation mode:
detecting, by the force measurement module, a third force waveform on a second force axis of the plurality of force axes,
wherein the speed is calculated based on the third force waveform.

7. A GNSS-enabled device, comprising:
a force measurement module configured to measure forces on the GNSS-enabled device;
a GNSS receiver; and
one or more processors and/or circuits configured to:
receive the force measurements from the force measurement module; and
during a first operation state:
operate the GNSS receiver in a high-power state;
calculate a step length based on the force measurements received from the force measurement module and location information received from the GNSS receiver;
store the step length in a memory module;
calculate the speed based on the location information received from the GNSS receiver;
switch from the first operation state to a second operation state when a first predetermined time period has elapse since the GNSS-enabled device entered the first operation state; and
switch from the second operation state to the first operation state when:
a second predetermined time period has elapsed since the GNSS-enabled device entered the second operation state; and
the calculated speed has changed from a previously-calculated speed by more than a predetermined threshold.

8. The GNSS-enabled device of claim 7,
wherein the one or more processors and/or circuits are further configured to:
during the second operation state:
operate the GNSS receiver in a low-power state; and
calculate the speed based on the force measurements received from the force measurement module and the stored step length.

9. The GNSS-enabled device claim 8,
wherein the one or more processors and/or circuits are further configured to:
during the first operation state:
detect a first force waveform from the force measurement module; and
store the first force waveform.

10. The GNSS-enabled device of claim 9,
wherein the one or more processors and/or circuits are further configured to:
during the second operation state:
detect, by the force measurement module, a second force waveform; and
perform pattern matching on the second force waveform to identify steps within the second force waveform.

11. The GNSS-enabled device of claim 10, wherein the force measurement module is configured to detect force on a plurality of force axes, and
wherein the second force waveform is detected on a first force axis of the plurality of force axes.

12. The GNSS-enabled device of claim 11,
wherein the one or more processors and/or circuits are further configured to:
during the second operation mode:
detect, by the force measurement module, a third force waveform on a second force axis of the plurality of force axes,
wherein the speed is calculated based on the third force waveform.

* * * * *

UNITED STATES PATENT AND TRADEMARK OFFICE
CERTIFICATE OF CORRECTION

PATENT NO. : 9,658,338 B2
APPLICATION NO. : 13/446744
DATED : May 23, 2017
INVENTOR(S) : Mole et al.

Page 1 of 1

It is certified that error appears in the above-identified patent and that said Letters Patent is hereby corrected as shown below:

In the Claims

Column 13, Line 3, please replace "a second redetermined time" with --a second predetermined time--.

Column 14, Line 5, please replace "period has elapse" with --period has elapsed--.

Signed and Sealed this
Twenty-seventh Day of March, 2018

Andrei Iancu
*Director of the United States Patent and Trademark Office*